July 29, 1930.　　　　J. A. PADJEN　　　　1,771,815
AUXILIARY AIR ADMISSION DEVICE
Filed Jan. 8, 1929　　3 Sheets-Sheet 1
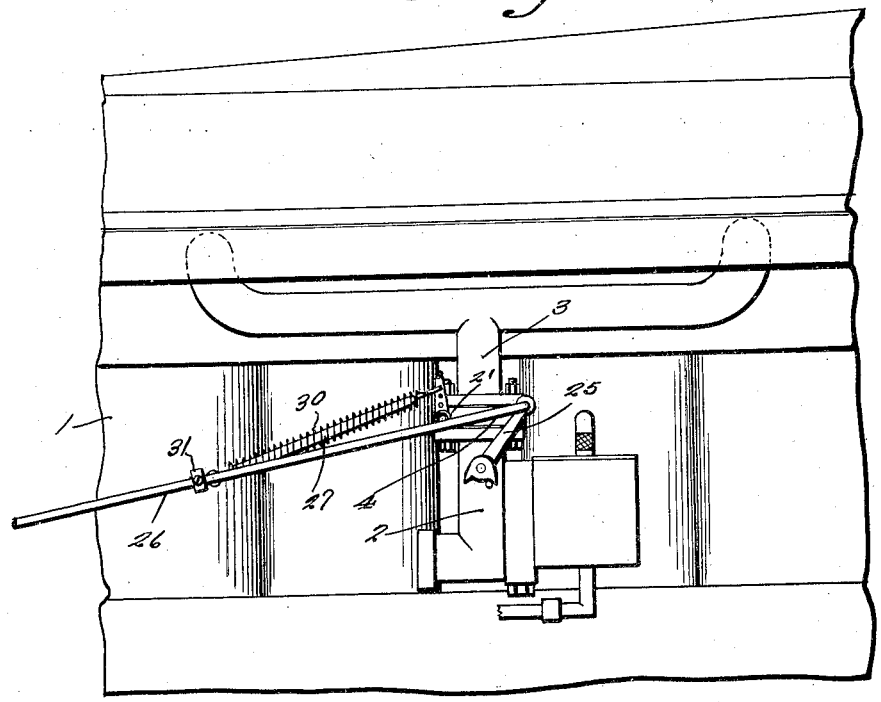
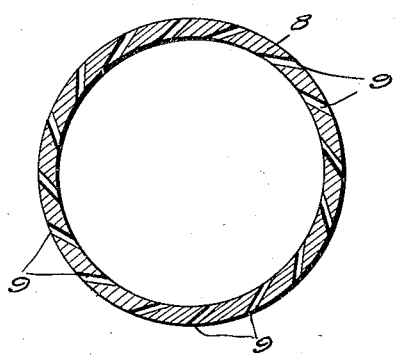
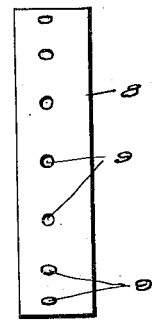
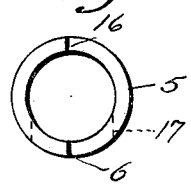
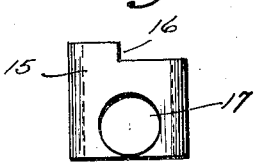
Inventor
John A. Padjen
By Clarence A. O'Brien
Attorney

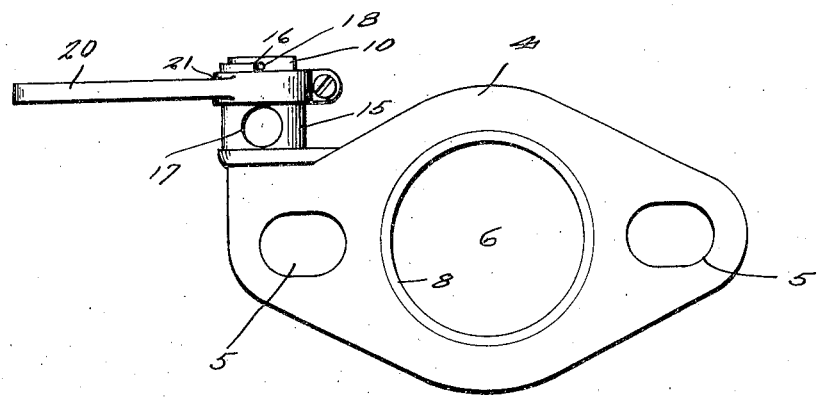
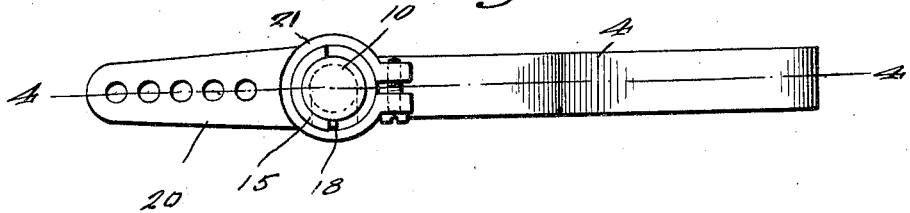
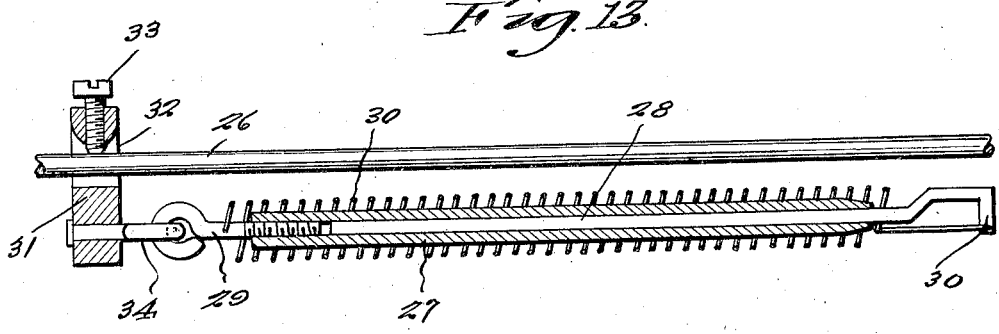
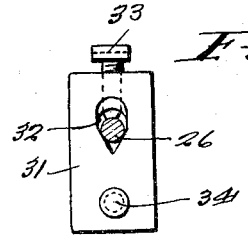

July 29, 1930. J. A. PADJEN 1,771,815
AUXILIARY AIR ADMISSION DEVICE
Filed Jan. 8, 1929 3 Sheets-Sheet 3
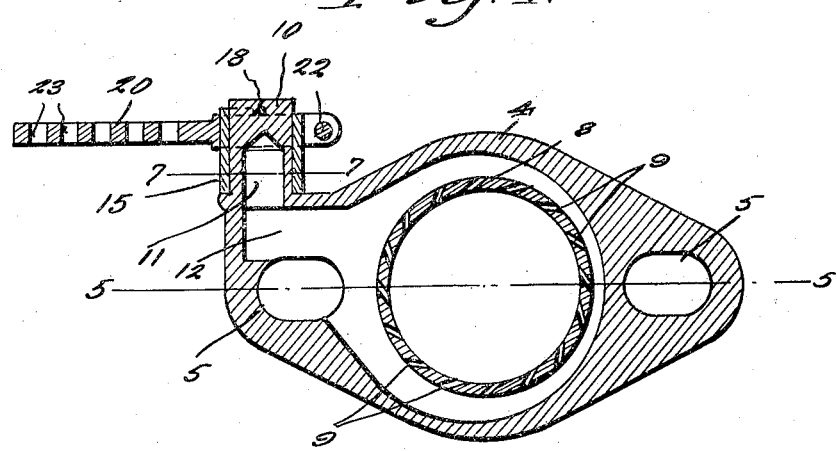
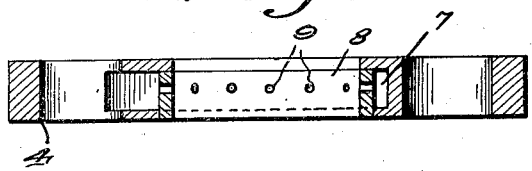
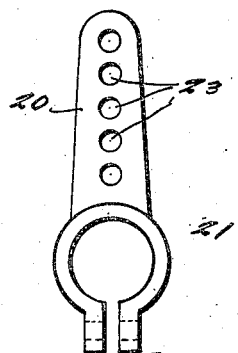
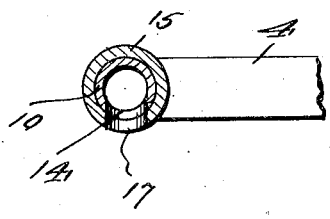
Inventor
John A. Padjen
By *Clarence A. O'Brien*
Attorney Patented July 29, 1930

1,771,815

UNITED STATES PATENT OFFICE

JOHN A. PADJEN, OF VERNON, UTAH

AUXILIARY AIR-ADMISSION DEVICE

Application filed January 8, 1929. Serial No. 331,046.

The present invention relates to auxiliary air admission devices and has for its principal object to provide a device which automatically breaks up, agitates and more thoroughly mixes a charge of gas and air for internal combustion engines.

Another important object of the invention resides in the provision of a device of this nature in the form of an auxiliary air inlet and mixing chamber for mixing air with a combustible fuel due to the internal combustion engine for increasing power to rise from the fuel, thereby permitting the obtaining of greater mileage per gallon of fuel, upon various makes of motor vehicles.

Another important object of this invention is to provide a mixer which is controlled from the dash or instrument board of the vehicle in conjunction with the usual accelerator and is located between the carbureter and the inlet into the cylinders of an internal combustion engine, said device comprising an air inlet with a control valve associated therewith.

A still further very important object of the invention resides in the provision of a device of this nature which is exceedingly simple in its construction, strong and durable, inexpensive to manufacture, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a fragmentary side elevation of an internal combustion engine showing my device associated therewith, Figure 2 is a plan view of the device, Figure 3 is an elevation thereof, Figure 4 is a sectional view taken substantially on the line 4—4 of Figure 3, Figure 5 is a sectional view taken substantially on the line 5—5 of Figure 4, Figure 6 is an end elevation of the device, Figure 7 is a detail section taken substantially on the line 7—7 of Figure 4, Figure 8 is a detail elevation of the crank arm, Figure 9 is a sectional view through the perforated ring, Figure 10 is an elevation thereof, Figure 11 is a plan view of the valve sleeve, Figure 12 is an elevation thereof, Figure 13 is a sectional view through the control link, and Figure 14 is an end view thereof.

Referring to the drawing in detail, it will be seen that the numeral 1 denotes a gas engine having a carbureter 2 and a manifold 3, all of which are usual.

My device is insertible between the manifold 3 and the carburetor 2 and consists of a flange 4 having holes 5 in either end of standard size and spacing to protect the usual bolts used to secure the manifold and carburetor together.

This flange 4 is centrally bored to provide openings 6 and the wall of this opening 6 is counterbored to provide an annular channel 7. A perforated ring 8 is disposed in the channel 7 so as to provide an annular chamber. The ring 8 is perforated as is indicated at 9 the perforations extending angularly to the radius of the ring.

A neck extension 10 is provided at one end of the flange being hollowed out to provide a chamber 11 communicating with the channel 7 by a passage 12. This neck is provided with an opening in one side thereof as at 14.

The valve sleeve 15 is rockable on the neck 10 and at its upper end is cut away to provide oppositely disposed stop shoulders 16. This sleeve has a side opening 17 capable of being brought into registration with the opening 14. A stop pin 18 is extended through the end of the neck 10 to hold the sleeve 15 in place on the neck and to limit the rocking movement thereof since the shoulder 16 will abut with this pin.

A crank arm 20 is provided with clamp collar 21 so that it may be engaged on the sleeve principally by means of a bolt 22 and this arm 20 is provided with a plurality of openings 23.

This crank arm swings in a vertical plane as will be apparent from an inspection of Figure 1 in the present exemplification of the invention.

The crank arm 25 operates the usual throttle valve carburetor 2 through a rod 26. The elements 25 and 26, of course, are usual. A special link is used to connect the rod 26 with the crank arm 20 and the construction of this special link is disclosed to advantage in Figure 13.

A tube 27 has a rod 28 slidable therein through one end and an eye bolt 29 threadedly engaged in the other end. The outer end of the rod 28 is hook shaped as at 30 to engage in one of the openings 23. A spring 30' of the coil type is disposed about the sleeve 27 and is anchored at one end to the bolt 29 while the other end is anchored to the hook shaped end 30 of the rod 28.

A block 31 is engaged with the rod 26 by being provided with an opening 32 through which the rod 26 passes and a set screw 33 threaded in the block to bind on the rod 26.

An eye bolt 34 in the block 31 is engaged with the eye bolt 29. From the above detailed description it will be seen that when the rod 26 is moved to the left in Figure 1 the link structure will cause the swinging of the crank 20 so as to open the valve sleeve 15 that is bringing its opening 17 into registry with the opening 14 so that air will be sucked in through the chamber 11 of the neck 10 into the chamber formed by the channel 7 and force the air through the opening 9 in the ring 8 to mix with the fuel gas passing up into the manifold 3.

The spring 30, obviously, compensates for too great movement of the rod 26 as will be quite apparent.

From the above detailed description it will be seen that as the gas mixture leaves the carburetor, it is whirled around and completely vaporized by the many diagonal gusts of air from the ring. As more gas is open, more vaporizing air is also admitted, and as the gas throttle is shut for an idling position, the extra air is cut off also, permitting the engine to idle quietly. Contrary to most other devices of this nature on the market, which draw more air when the engine idles than when the throtle is open, with such a device an engine cannot idle quietly and does not save any gas at higher speeds.

It will be seen that this device accomplishes a saving of gasoline and oil and provides greater power, speed and flexibility and a smoother running engine. Furthermore the device tends to eliminate spark trouble and obnoxious exhaust smoke.

It is thought that the construction, operation, utility and advantages of this invention will now be quite apparent to those skilled in this art without a more detailed description thereof.

The present embodiment of the invention has been disclosed in detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In a device of the character described including an open gasket-like plate adapted to be inserted between the carburetor and manifold of a gas engine and to be secured in place by the connecting means of said manifold and carburetor, said plate having an air inlet passage for the admission of air thereinto, a rotatable valve for controlling the entrance of air into the passage, a crank arm connected to the valve, and means for coupling the crank arm to the carburetor throttle rod in a manner to swing said arm in unison with the throttle rod, said means comprising an elongated rod having a hook on one end extending through the crank arm, a guide tube slidably mounted on the free end of the rod, an eye bolt threaded into the forward end of the guide tube, a coil spring encircling the tube and extending longitudinally thereover and having one end anchored to the eye bolt and the other end connected to the free ends of the hooks in a manner to retain the same in the crank arm, an anchoring plug slidably mounted for longitudinal adjustment on the throttle rod, means for securing said anchoring block in adjusted position, and a coupling element connecting the eye bolt to the anchoring block.

In testimony whereof I affix my signature.

JOHN A. PADJEN.